US007783852B2

(12) United States Patent
Lahiri et al.

(10) Patent No.: US 7,783,852 B2
(45) Date of Patent: Aug. 24, 2010

(54) TECHNIQUES FOR AUTOMATED ALLOCATION OF MEMORY AMONG A PLURALITY OF POOLS

(75) Inventors: Tirthankar Lahiri, Santa Clara, CA (US); Poojan Kumar, Foster City, CA (US); Brian Hirano, Menlo Park, CA (US); Arvind Nithrakashyap, San Francisco, CA (US); Kant Patel, Foster City, CA (US); Kiran Goyal, Mountain View, CA (US); Juan R. Loaiza, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 151 days.

(21) Appl. No.: 10/746,471

(22) Filed: Dec. 23, 2003

(65) Prior Publication Data

US 2005/0114621 A1 May 26, 2005

Related U.S. Application Data

(60) Provisional application No. 60/525,595, filed on Nov. 26, 2003.

(51) Int. Cl.
*G06F 12/00* (2006.01)
(52) U.S. Cl. .................. 711/170; 711/171; 707/812; 718/104
(58) Field of Classification Search .......... 711/170, 711/171; 707/812; 718/104
See application file for complete search history.

(56) References Cited

U.S. PATENT DOCUMENTS

| 4,603,382 A | * | 7/1986 | Cole et al. ............. 710/56 |
| 5,394,531 A | * | 2/1995 | Smith ................... 711/136 |
| 5,627,994 A | * | 5/1997 | Levy et al. ............. 711/150 |
| 5,651,136 A | * | 7/1997 | Denton et al. .......... 711/118 |
| 5,778,411 A | * | 7/1998 | DeMoss et al. .......... 711/4 |
| 6,061,763 A | * | 5/2000 | Rubin et al. ........... 711/129 |
| 6,070,202 A | * | 5/2000 | Minkoff et al. .......... 710/56 |

(Continued)

OTHER PUBLICATIONS

Tanenbaum, Andrew S., "Structured Computer Organization", 1984, Prentice-Hall, Inc., 2nd Edition, pp. 10-12.*

(Continued)

*Primary Examiner*—Sanjiv Shah
*Assistant Examiner*—Arpan Savla
(74) *Attorney, Agent, or Firm*—Hickman Palermo Truong & Becker LLP; Eric L. Sutton

(57) ABSTRACT

Allocation of memory is optimized across multiple pools of memory, based on minimizing the time it takes to successfully retrieve a given data item from each of the multiple pools. First data is generated that indicates a hit rate per pool size for each of multiple memory pools. In an embodiment, the generating step includes continuously monitoring attempts to access, or retrieve a data item from, each of the memory pools. The first data is converted to second data that accounts for a cost of a miss with respect to each of the memory pools. In an embodiment, the second data accounts for the cost of a miss in terms of time. How much of the memory to allocate to each of the memory pools is determined, based on the second data. In an embodiment, the steps of converting and determining are automatically performed, on a periodic basis.

30 Claims, 3 Drawing Sheets

U.S. PATENT DOCUMENTS

| | | | |
|---|---|---|---|
| 6,453,403 | B1* | 9/2002 | Czajkowski ................. 711/170 |
| 6,578,129 | B1* | 6/2003 | da Silva, Jr. et al. ........ 711/209 |
| 6,952,664 | B1 | 10/2005 | Lahiri et al. ................... 703/14 |
| 6,961,835 | B2* | 11/2005 | Lightstone et al. .......... 711/171 |
| 2003/0101324 | A1* | 5/2003 | Herr et al. .................... 711/170 |
| 2004/0111514 | A1* | 6/2004 | Chase et al. ................. 709/226 |
| 2005/0071599 | A1* | 3/2005 | Modha et al. ............... 711/170 |

OTHER PUBLICATIONS

Xi et al., "An Analytical Model for Buffer Hit Rate Prediction", 2001, Proceedings of the 2001 Conference of the Centre for Advanced Studies on Collaborative Research, IBM Centre for Advanced Studies Conference, pp. 1-12.*

Tian et al., "Techniques for Automatically Sizing Multiple Buffer Pools in DB2", 2003, Proceedings of the 2003 Conference of the Centre for Advanced Studies on Collaborative Research, IBM Centre for Advanced Studies Conference, pp. 1-9.*

Martain et al., "Dynamic Reconfiguration Algorithm: Dynamically Tuning Multiple Buffer Pools", Sep. 2000, Proceedings of the 11th International Conference on Database and Expert Systems Applications, Lecture Notes in Computer Science, vol. 1873, pp. 92-101.*

Tian, Wenhu, "Sizing Multiple Buffer Pools for DBMSs", Jan. 2003, Queen's University, Masters Thesis.*

Chung et al., "Goal-Oriented dynamic pool management for data base systems", 1995, First IEEE International Conference on Engineering of Complex Computer Systems, IEEE, pp. 191-198.*

Dan et al., "Database Access Characterization for Buffer Hit Prediction", 1993, Proceedings of the Ninth International Conference on Data Engineering, IEEE Computer Society, pp. 134-143.*

Cyran et al., "Oracle9i Database Performance Guide and Reference Release 1 (9.0.1)", 2001, Oracle Corporation, Part No. A87503-02, pp. Chapter 14. Jun. 11, 2009 <http://www.cs.uvm.edu/oracle9doc/server.901/a87503/toc.htm>.*

* cited by examiner

TECHNIQUES FOR AUTOMATED ALLOCATION OF MEMORY AMONG A PLURALITY OF POOLS

CROSS REFERENCE TO RELATED APPLICATIONS

This application claims the benefit of priority to U.S. Provisional Patent Application No. 60/525,595 filed on Nov. 26, 2003, entitled "Techniques for Automated Allocation of Memory Among a Plurality of Pools", which is incorporated by reference in its entirety for all purposes as if fully set forth herein.

FIELD OF THE INVENTION

The present invention relates generally to memory management and, more specifically, to techniques for automated allocation of memory.

BACKGROUND OF THE INVENTION

Computer memory is often allocated among multiple memory pools or components, which are portions or ranges of memory, e.g., blocks, used to satisfy different classes of memory allocation requests. The size of each of the memory pools is typically controlled by and managed through use of separate memory parameters.

With some approaches to memory management, a management system may specify static default values for the sizes of each memory pool based on certain heuristics, such as allocate 20% of the available total shared memory to memory pool X, etc.). With other approaches to memory management, a system administrator is responsible for manually sizing memory pools. Any attempt to optimize such sizing typically involves an iterative process of trial and error, and is a difficult task because the different memory pools are used for different purposes. Optimal allocation of memory among the pools is a real-time function of the type of workload that is occurring on a given application(s) that is using the memory. Hence, an optimal allocation of memory varies, based on time of day, geographic location, etc.

For example, a database server may employ several memory pools, such as a first pool for use when performing backup jobs, and a second pool used for on-line transaction processing (OLTP) activities. If a system is configured with a first pool to accommodate a nightly recovery management backup job, most of this memory, which could have been better utilized by the second pool for OLTP activity, remains unused for the majority of the day. On the other hand, if such backup jobs are not performed or are not completed because the first pool is set too small, then the cost of failures could be prohibitive from a business point of view, leaving administrators with few other options.

In practice, an administrator sets the memory allocation parameters for a given application or cluster of applications, and such allocation is infrequently revisited, if at all. Undersized pools could lead to application failures due to failure to allocate sufficient memory to given pools, and to performance problems arising from the need to reload data or perform excessive disk I/O. Hence, memory pool allocations are commonly oversized to handle the worst scenarios while attempting to avoid system errors, and with the goal of avoiding the need for reallocation. For example, some types of pools are often oversized to prevent application errors, at detriment to the performance of other pools.

Based on the foregoing, there is a general need for a technique for managing memory that is allocated among multiple memory pools that does not result in the inefficiencies described above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Functional Overview of Embodiments

Figure 1:
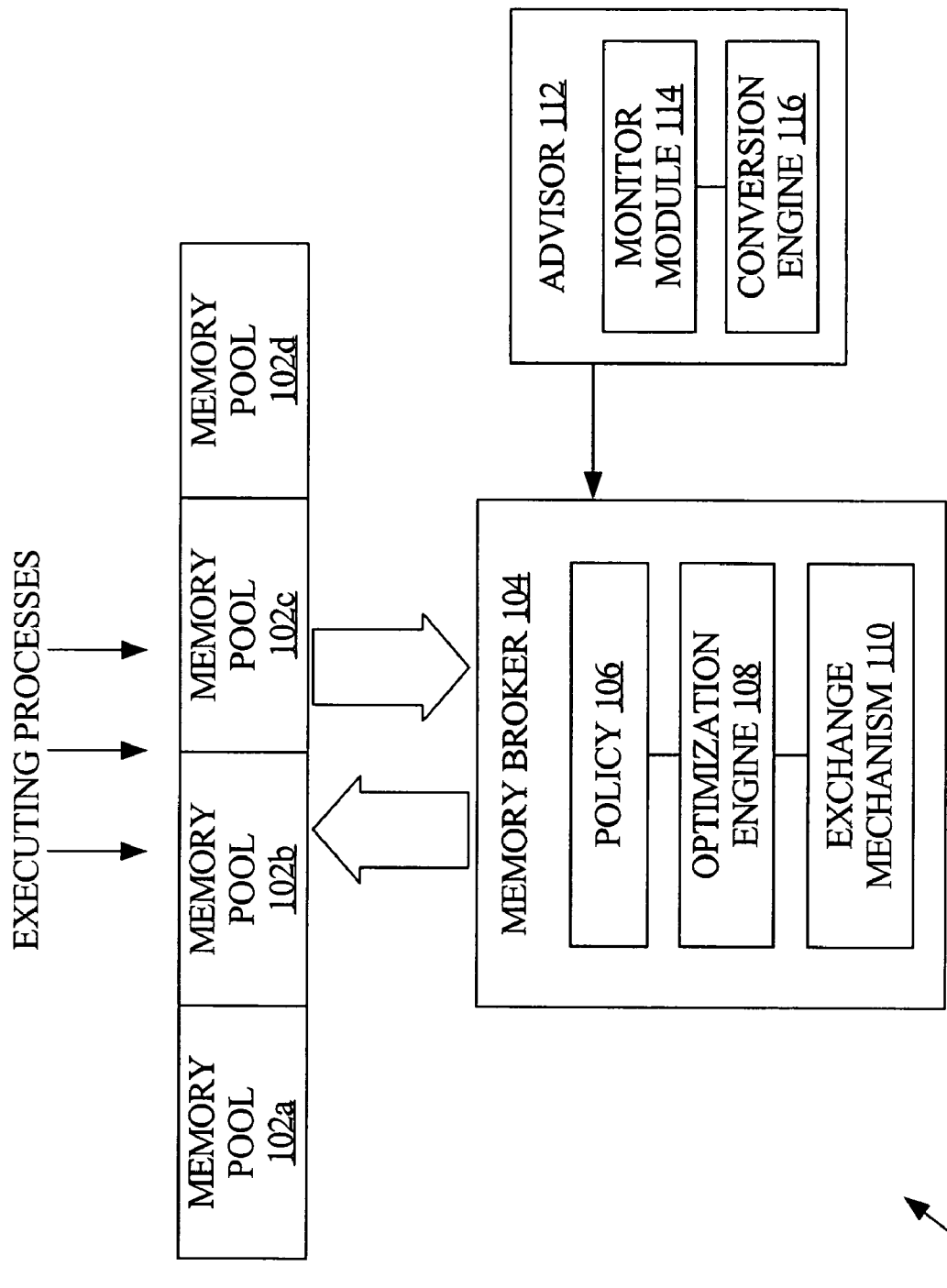
FIG. 1 is a block diagram that illustrates a memory exchange model, an environment in which embodiments of the invention may operate.

According to one aspect, memory is automatically allocated among multiple memory pools. The allocation of memory is adaptive and is optimized across the multiple pools, based on minimizing the time it takes to successfully retrieve a given data item from each of the multiple pools. Generally, optimizing memory allocation involves determining the smallest size for a given pool, with the maximum performance benefit provided by that pool. One embodiment features a system for auto-tuning individual sizes of memory pools within a shared memory. The system includes an advisory mechanism that predicts performance corresponding to different sizes of respective said memory pools, and a memory agent that periodically determines memory pool sizes based on the predicted performance of said memory pools, to optimize performance of said shared memory. In one embodiment, the memory agent determines memory pool sizes optimize performance by determining memory pool sizes to minimize response time associated with use of said shared memory. In one embodiment, the agent includes an exchange engine for automatically transferring memory among said memory pools based on determined memory sizes.

Often, some memory pools are caches and their sizes are tunable, while other memory pools are simply sources of free memory to be used for general allocations and are untunable. However, some tunable pools have a relatively small minimum untunable size. Furthermore, optimizing untunable pools often involves sizing an untunable pool just large enough to accommodate all the simultaneous allocations out of that pool.

In an embodiment, first data is generated that indicates a hit rate per pool size for each of multiple memory pools. The step of generating the first data in such an embodiment can include continuously monitoring attempts to access, or retrieve a data item from, each of the memory pools. The first data is converted to second data that accounts for a cost of a miss with respect to each of the memory pools. The second data can indicate the cost of a miss in terms of time. How much of the memory to allocate to each of the memory pools is determined, based on the second data. The steps of converting and determining can be automatically performed, on a periodic basis.

In an embodiment, after determining how much memory to allocate to each pool, the memory is allocated to the pools incrementally over time rather than all at once. In other embodiments, upon shut-down of the application, how much memory is currently allocated to each memory pool is recorded in persistent storage. Upon restart of the application, that information is read from the persistent storage and the memory pools are initially allocated based on the information.

With memory used as cache, when an item being accessed is not found in the cache memory, the item is retrieved from slower secondary storage, such as a disk. For a non-limiting example, a global memory area that is shared by multiple processes in a database instance may be allocated into pools for (1) storing SQL cursors and other program execution state information, such as the state of a SQL query or a PL/SQL or other procedure, as an in-memory representation of, for example, a parse tree and execution plan related to a SQL query (sometimes referred to as a "shared pool" or "SQL cache"); (2) storing objects represented in the Java programming language (sometimes referred to as a "Java pool" or "Java object cache"); (3) storing data items retrieved from persistent storage in a buffer (sometimes referred to as a "buffer cache" or "disk block cache"), such as a group of buffers that can be shared by multiple processes within an instance; and (4) serving as a source of memory for allocation to processes requesting a relatively large amount of memory (sometimes referred to as a "large pool"). In this context, "large" may be relative to both the total memory allocated to an instance and to the amount of memory requested by a given process. For an example of the latter, a recommended size of a runtime allocation in a shared pool may be on the order of a few kilobytes, whereas if a requestor wants a larger allocation (e.g., on the order of tens or hundreds of kilobytes), the requestor should allocate from the large pool.

According to one aspect, a pool of memory that functions as a source of memory for executing processes (e.g., a large pool or, in some cases, a shared pool) and which is not one of the multiple pools for which first data is generated, is allocated memory in response to or on demand from a request from a process.

In an embodiment that may be used in a system that includes a large pool and a buffer cache, a portion of memory is made available to the large pool from the pools for which first data is generated. In an embodiment, the portion of memory is transferred from a buffer cache. Furthermore, in an embodiment, the step of making available to the large pool includes making available a "pinned" sub-portion of the portion of memory, where a separate process or processes other than the requesting process is using the pinned sub-portion. After making available the sub-portion to the large pool, the pinned sub-portion continues to be used by the separate process(es). In response to completing use by the separate process(es), the large pool is allowed to use the sub-portion of memory. In other embodiments, the pinned memory is held for a period of time after the requesting process completes use, before being transferred from the large pool to the other pools.

Operating Environment

FIG. 1 is a block diagram that illustrates a memory exchange model 100. Exchange model 100 represents an environment in which embodiments of the invention may operate.

Memory Pools

As discussed, in some application architectures, volatile memory ("managed memory") is allocated among different memory pools, such as memory pools 102a, 102b, 102c, 102d, that are used to satisfy different classes of memory requests.

A memory pool may be managed as particular amounts or units of memory, referred to herein as memory "granules". A granule of memory refers to a unit of allocation in the managed memory. In an embodiment, memory pools participate in methods for adding and releasing granules in response to auto-tuning actions and user-initiated resize operations and for managing memory constituent to those granules.

The number of memory pools within a managed memory can vary from implementation to implementation. Therefore, the illustration of four memory pools 102a–102d in FIG. 1 is for purposes of example and explanation and does not limit embodiments of the invention.

Tunable Memory Pools

Each memory pool can be described as tunable or untunable. A memory pool is tunable if the application that uses the memory, such as a database server, can continue to run with different sizes for the given pool. In general, increasing the size of a tunable pool typically improves performance, while decreasing the size is detrimental to performance. A tunable memory pool essentially functions as a cache.

Examples of tunable memory pools in the context of a database server include SQL cache, Java object cache and buffer cache.

Untunable Memory Pools

An untunable memory pool has to be a minimum size for the application to run and, once above the minimum size, provides no further benefits. An untunable pool is a pool from which memory is allocated to a process at runtime in response to some operation. Untunable pools should be sized to accommodate the largest possible memory request from an application process, up to some reasonable limit.

An example of an untunable memory pool in the context of a database server is the large pool. Using a large pool can protect the shared pool from use by processes in need of large untunable allocations of memory, so that the shared pool can be used primarily and effectively as a cache. In addition, a shared pool may also exhibit untunable behavior if an allocation request cannot be satisfied after attempting to free the items on the shared pool's LRU (least recently used) list.

Memory Broker

Memory broker 104 is a module for performing automated management of memory that is allocated among multiple memory pools, such as pools 102a–102d. In one embodiment, the code that embodies memory broker 104 executes in response to requests from foreground processes, in addition to executing as a periodic background operation for background resizing of the memory pools.

Memory broker 104 includes a policy 106, an optimization engine 108 and an exchange mechanism 110 for determining how memory resources should be distributed among the multiple memory pools 102a–102d and for facilitating redistribution of the memory resources through pool resizing processes.

Policy

Policy 106 is a set of information that reflects policies regarding the distribution of resources among the memory pools relative to a given application or application instance that embodies broker 104. Non-limiting examples of information contained in policy 106 include (1) identification of a default memory donor and a default memory recipient; (2) performance metrics such as SQL parse time, Java object load time, disk 10 time, active server time; (3) identification of initial values of tunable pools (e.g., in granules); (4) identification of maximum sizes for tunable pools (e.g., as a percent of managed memory size); (5) identification of policies for each memory pool regarding growth and shrinkage; and (6) advisories from advisor 112. In general, policy 106 determines how often to get data from advisories and decides whether there is sufficient and reliable enough information to act upon the data. Advisories, and the use thereof, are explained in greater detail hereafter.

Optimization Engine

Optimization engine 108 operates to determine how much memory to allocate to memory pools 102a–102d. Optimization engine 108 relies on policy 106 and advisories from advisor 112, as well as other performance metrics, to make such a determination. The analysis and optimization process performed by optimization engine 108 is described in more detail below in reference to block 206 of FIG. 2.

Exchange Engine

Exchange engine 110 operates to facilitate the exchange of memory among memory pools 102a–102d. In response to receiving a request for memory (e.g., a memory requirement) from an executing foreground process, the exchange engine 110 creates a resize request structure and, based on input from optimization engine 108, determines which of the memory pools 102a–102d are to release memory to transfer to a different memory pool for the requesting process.

In an embodiment, a memory resize request structure is used to track every pool resize request. When a foreground process is unable to allocate memory in a memory pool, the request structure is created by the memory broker 104, executing as a background process. The actual resize operation may be performed entirely within the waiting foreground process or by a background process, depending on the implementation of the given memory pool. The actual configuration of the memory resize request structure is not limited to any specific data structure and, therefore, may vary from implementation to implementation.

Advisor

Exchange model 100 further comprises an advisor 112, having a monitor module 114 and a conversion engine 116. Generally, advisor 112 provides advisories to memory broker 104 based on simulations and predictions regarding the performance and total size of the memory as well as the various memory pools 102a–102d. Such advisories are used by the optimization engine 108 of memory broker 104, in conjunction with policy 106, to determine optimum allocations of memory to pools 102a–102d.

For a non-limiting example, an advisor for a SQL cache pool may operate as follows. Based on internal real-time simulations that are based on measurements of actual usage, this advisor would predict how the parse time for the database changes with the size of the SQL cache. For example, if the SQL cache is under-configured for a given workload, this advisor would predict that the parse time on the database instance would reduce by 20% if the SQL cache size were increased by 30%. Similarly, another non-limiting example is an advisor for the buffer cache. Based on internal real-time simulations that are based on measurements of actual usage, this advisor would predict how the disk I/O rate for the database changes with the size of the buffer cache.

Monitor Module

Monitor module 114 continuously monitors activity related to each of memory pools 102a–102d, such as attempts to retrieve data items from the pools. From the information obtained via monitoring, monitor module 114 can generate a hit rate per pool size for each of memory pools 102a–102d. Refer to block 202 of FIG. 2 for further description of the functionality of monitor module 114.

Conversion Engine

Conversion engine 116 converts, either continuously or periodically, the hit rate information obtained by monitoring module 114 into a time-based metric for each of memory pools 102a–102d. The metric indicates the cost of a miss associated with a retrieval from a given memory pool, in terms of time, to the performance of the application or system. The converted information is provided to memory broker 104 to assist optimization engine 108 in determining an optimum memory allocation among pools 102a–102d. Refer to block 204 of FIG. 2 for further description of the functionality of conversion engine 116.

Process for Automated Memory Managment

Figure 2:
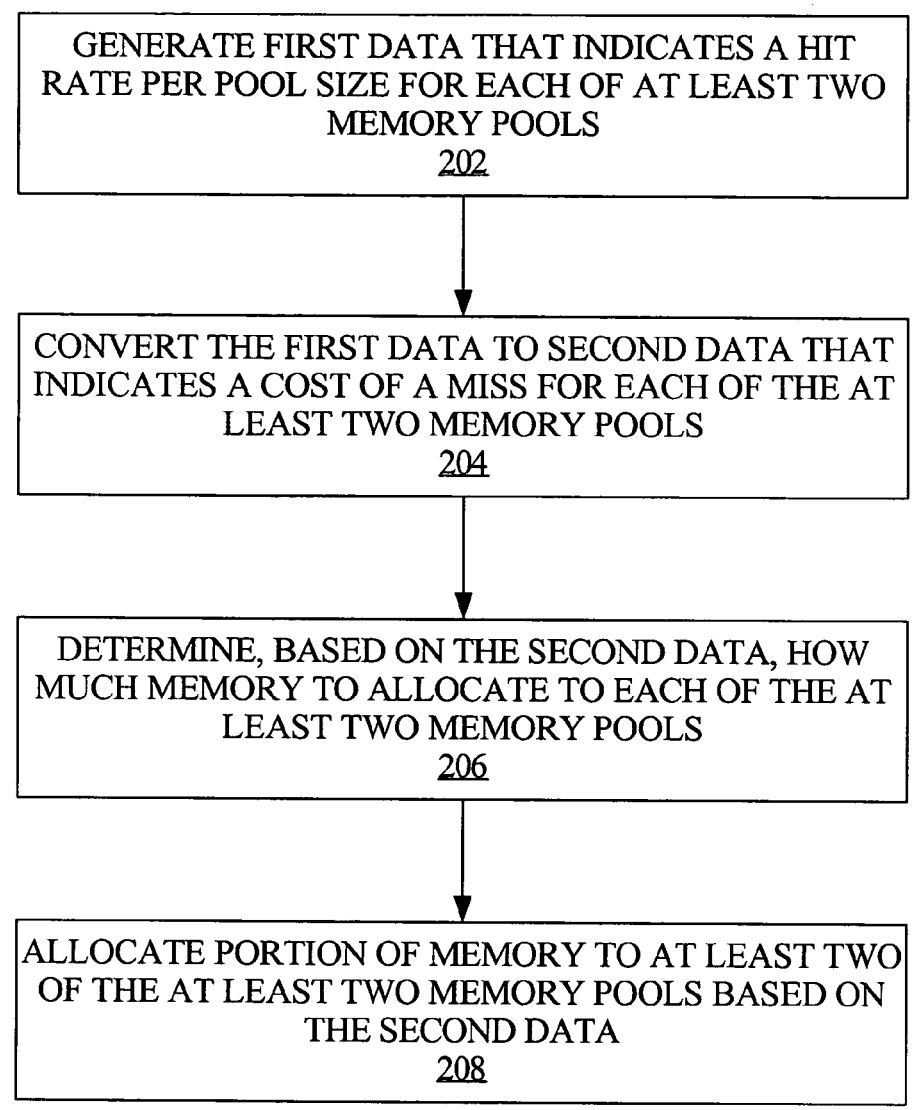
FIG. 2 is flow diagram that illustrates a process for automated memory management.

FIG. 2 is flow diagram that illustrates a process for automated memory management. More specifically, FIG. 2 illustrates a process for managing memory (i.e., managed memory) that is allocated among multiple tunable memory pools. The process may be referred to as "self-tuning" or "self-managing" because, according to one embodiment, the process is primarily performed by a memory broker that is associated with an application that uses the volatile memory being allocated or "tuned", such as memory broker 104, with reliance on an advisor 112.

Background Resizing

Block 202: Generate Data

At block 202, first data that indicates a hit rate per pool size for at least two of the multiple memory pools is generated. For example, in the context of a database environment, first data is generated for at least two of the tunable memory pools, such as the SQL cache, Java object cache and buffer cache. In an embodiment, the monitor module 114 of advisor 112 continuously and automatically monitors activities regarding the relevant memory pools, over multiple time intervals. For example, the monitor module 114 monitors attempts to retrieve a data item from each of the pertinent memory pools, by gathering such statistical information every N minutes for the preceding N minute period. In one non-limiting implementation, the statistical information is gathered and processed in five-minute increments. Furthermore, in one non-limiting implementation, the periodic statistical information is saved every $N*2^i$ minutes, where $0<i<N$; however, embodiments are not limited to that specific time interval.

From the information gleaned from the monitoring process, such as data references received by a pool from an executing process, a metric referred to as the "hit rate" that represents successful data item retrievals is continuously computed, for a given interval, for the current pool sizes by the monitor module 114. From this real data, other hit rates can be estimated or predicted for various other pool sizes for a given memory pool, on both sides of the current pool size, and simulation graphs can be constructed based on the real and predicted data. Thus, the subsequent optimization routine is based on actual real-time and associated simulated data relative to the application and/or system architecture, configuration and workload, rather than merely on historical statistical data or simply on occurrence of an event, such as a failure.

One such technique that can be implemented for generating data that indicates a hit rate per pool size, for each of the pertinent tunable memory pools, is described in U.S. Pat. No. 6,952,664, entitled "System and Method for Predicting Cache Performance", which is incorporated by reference in its entirety for all purposes as if fully disclosed herein.

Block 204: Convert Data

At block 204, the first data that indicates a hit rate per pool size is converted to second data that indicates the cost of a miss with respect to each of the multiple memory pools being tuned. In an embodiment, block 204 is performed by conversion engine 116 of advisor 112. In an embodiment, the second data indicates the cost of a miss in terms of time. Thus, each of the hit rates per pool size is converted to the time domain, wherein the converted data indicates how much time, or performance, penalty (e.g., latency) results from an unsuccessful attempt to retrieve a data item from a given memory pool.

For example, it is not really meaningful to compare the cost of a disk read due to a buffer cache miss with the cost of performing a SQL parse. Hence, the costs relative to the different memory pools are "normalized" to a time metric so that a meaningful comparison and optimization routine can be performed on the different memory pools. For example, the cost of a disk IO can be measured in terms of the average observed time to perform a disk IO, thus a count in terms of disk IOs can be converted to a time penalty incurred in waiting for such IOs to complete. Furthermore, the metrics relied on for conversion of the data are readily available from conventional monitoring of the application or system, such as average disk read time and statement or document parse time. In one non-limiting implementation, the conversion at block 204 is performed substantially concurrently with the gathering, or generating, at block 202.

Block 206: Determine Memory Pool Allocations

Periodically, memory broker 104 consults advisories from advisor 112, policy 106 and various metrics, if necessary, to determine, based on the second data, how much of the memory to allocate to each of the pertinent memory pools to improve performance, at block 206. For example, in one non-limiting implementation, the advisory statistics generated at block 202 and converted at block 206 are saved and analyzed every $N*2^i$ minutes, where $0<i<N$. In one embodiment, analysis of the advisory statistics involves scanning the statistics associated with each of the N intervals and upon identifying the first interval that results in a recommended resizing operation, the operation is initiated. In one embodiment, once a resize operation is initiated, no further resize operations are initiated for that particular analysis cycle.

Examples of useful metrics in the context of a database server include SQL parse time, Java object load time, disk IO time and active server time. In a database server context, active server time can be defined as the aggregate of all non-idle time spent by database processes and is a measure of total response time for a database user. For example, if active server time is 100 seconds with 10 database users, then the users have on average spent 10 seconds waiting for their database operations to complete.

With a goal of maximizing system performance by minimizing response time for data retrieval from each of the memory pools, an optimal distribution of memory granules is determined. Thus, each memory pool changes size in some increment of a granule. In a non-limiting implementation, a granule is 4 Mb of memory. However, the size of a granule or other unit of memory transfer (e.g., one or more pages) may vary from implementation to implementation. In addition, broker 104 is capable of consulting with the untunable memory pools to see whether the untunable pools are able to release any free granules.

The manner in which the memory allocations are determined at block 206 may vary from implementation to implementation. In general, the determination of block 206 is based on conventional iterative combinatorial optimization processing (e.g., mathematical programming) of the data output from block 204. For example, an implementation of optimization engine 108 may analyze every possible combination of pool sizes based on the data points for each pool to arrive at the optimal distribution.

The steps of generating data (block 202), converting the hit rate data (block 204) and determining how much memory to allocate to the memory pools (block 206) are performed automatically with no need for user interaction. The cycle times mentioned above may vary from implementation to implementation, however, the techniques should be implemented for a given system with a cycle time that allows for a meaningful and credible determination for the given system.

Block 208: Allocate Memory to Memory Pools

At block 208, portions of the memory are automatically allocated to the memory pools, based on the second data. Hence, the determination made at block 206 is actually implemented in the system, at least partially, by changing the allocation of memory in at least two of the memory pools. In an implementation, block 208 is cooperatively completed by exchange mechanism 110 of memory broker 104, memory pools 102a–102d, and requesting and releasing processes. All of the memory pools may not be changed at block 208 because some of the memory pools may be determined, at block 206, to already be optimally allocated. For example, in a system with three memory pools, memory may be swapped between two of the pools with the third pool remaining as is.

A memory pool "grow" operation that is initiated by the memory broker passes to the relevant memory pool a list of granules and invokes the memory pool to add the granules to its internal data structures. In an embodiment, a separate list of granule descriptors is maintained for each memory pool. A granule descriptor is a data structure that identifies a granule of memory, such as through a pointer to the start of the granule, and maintains state regarding the ownership of the granule.

In an embodiment, any change to the allocation of a given memory pool is performed incrementally based on the determination at block 206, so that the redistribution of memory is not sensitive to sudden atypical spikes in the workload. For example, if it is determined that an optimal amount of memory for pool X is fifty percent more than the current allocation of memory to pool X, then the allocation of memory to pool X is increased by only five percent in each process cycle. A process cycle is the cycle in which blocks 204–208 are performed, such as presented in the example above as a matter of minutes. Hence, in this example, it would take ten cycles to reallocate the memory of pool X to the level determined at block 206. However, the determination at block 206 is performed repeatedly, so the optimal amount of memory to allocate to pool X may change due to real-time system performance before the fifty percent increase level is ever reached. In the example, the allocation is changed in equal incremental amounts in each cycle. However, the manner in which the reallocation is performed incrementally may vary from implementation to implementation. For example, an implementation may double the amount of allocation change relative to the previous change, for each cycle, until the determined goal is reached or the determined goal changes.

With this incremental approach, the potential for a significant impact on overall system performance due to processing overhead associated with relatively large memory pool reallocation or resize operations, is reduced or minimized. Furthermore, the incremental approach, coupled with the feedback loop involving the continuous monitoring and periodic analysis, dampens the impact that a given memory reallocation operation may have on the performance of the overall system. Therefore, the performance of the system should be more stable than if the entire reallocation operation is performed in a single cycle.

In an embodiment, the memory pool allocation sizes are preserved across shut-down of the application instance. The current size of each of the memory pools at the time of shut-down are tracked via a persistent parameter file, stored in persistent memory, that the application can write to. This ensures that pool sizes survive instance shut-down and that valuable information is maintained from the prior incarnation of the instance. Furthermore, upon subsequent start-up of the application instance, the sizes are read from the persistent memory and the memory pools are initially allocated based on the size at shut-down. Hence, the instance starts with a substantially optimal memory pool allocation. In other words, the given instance starts from a better point than if the optimization values were overwritten and the memory pools were reset to the default values.

Immediate Resizing

An immediate resize request is a high priority request that must be satisfied for the application to proceed. If memory is needed in response to a user operation that has run out of memory in an untunable memory pool, then memory needs to be transferred to that pool as quickly as possible without involving waits for events that can take an unbounded amount of time. For example, it is unacceptable to block the operation until some users log out, or until some users complete their operations.

According to an aspect, when a memory pool is out of memory in servicing a request, the memory pool registers an immediate need with the memory broker. The broker will then initiate a fast transfer of memory from another memory pool. Immediate resizing requests often come from untunable memory, such as the large pool; however, immediate resizing requests may also come from a tunable memory pool, such as a shared pool. As mentioned, some tunable memory pools have an untunable minimum size. For an example in the context of a database server, the minimum untunable size for a shared pool may be the sum of the sizes of all the concurrently pinned SQL execution objects and the minimum untunable size for a buffer cache may be the sum of the sizes of all the concurrently pinned buffers.

In an embodiment, the large pool is initially allocated a default minimal amount of memory prior to any influence from the process illustrated in FIG. 2. For example, the large pool may be allocated a single granule of memory. In response to a request from an executing process, memory is automatically and immediately transferred from one or more of the other memory pools to the large pool. Hence, the untunable memory, which is not optimized according to the process of FIG. 2, only grows when necessary, or on demand.

In another embodiment, an immediate transfer of memory is made upon request to a pool other than the large pool, such as the shared pool.

In a related embodiment, the memory is transferred from a buffer cache because it typically is the largest pool of the multiple memory pools and typically has the smallest percentage of pinned memory. In contrast, memory associated with the shared pool and the Java pool may be pinned for long periods of time and is, consequently, more difficult to make available for other uses.

Pinned Memory

One distinction between a background resize request and an immediate resize request is that an immediate resize request may be serviced with granules that are partially free. Since an immediate resize request cannot wait for user operations to end, it cannot afford to wait for all parts of a granule to become free. Thus, in an embodiment, in response to an immediate resize request, the memory broker performs a best-effort operation to return as much memory as possible by selecting granules that have the smallest percentages in use, or pinned.

A granule that is only partially free (i.e., the granule is, therefore, partially pinned) can be handed to and thus made available to the particular memory pool that requires the memory. The particular memory pool queries the granule to determine which portions are useable and then uses the useable portions. Once pinned portions are freed, that is, once the process that was using a pinned portion of memory completes use of the memory, the portion that was pinned and is now freed is useable by the requesting process. Hence, this process expedites the movement of memory among the various memory pools.

For an example in the context of a database server, if the large pool requests memory from the buffer cache, the memory broker 104 (FIG. 1) chooses a granule and the buffer cache attempts to free what buffers on the granule it can free. At the end of this pass, which is only made through the granule at this time, the granule contains both free memory that is currently not in use by the buffer cache and memory that is currently being used by the buffer cache (e.g., pinned buffers). The large pool gets the granule, puts the memory that has been freed by the buffer cache on the large pool's free list, and ensures that the buffer cache's pinned memory remains unavailable for use. Over time, once the buffer cache is done with the pinned buffer memory and unpins the buffers on the granule, the memory broker notifies the large pool that it can now use the memory that was previously pinned.

For example, the large pool requests memory from the buffer cache. The memory broker 104 (FIG. 1) chooses a granule and the buffer cache attempts to free what buffers on the granule it can free. At the end of this pass, which is only made through the granule at this time, the granule contains both free memory that is currently not in use by the buffer cache and memory that is currently being used by the buffer cache (e.g., pinned buffers). The large pool gets the granule, puts the memory that has been freed by the buffer cache on the large pool's free list, and ensures that the buffer cache's pinned memory remains unavailable for use. Over time, once the buffer cache is done with the pinned buffer memory and unpins the buffers on the granule, the memory broker notifies the large pool that it can now use the memory that was previously pinned.

For example, in the case of buffer cache, foreground processes pin buffers for accessing the buffer and IOs read from persistent storage if the requested data block is not in the cache. Buffers that are "dirty" and require write to persistent storage cannot be freed and, therefore, are equivalent to pinned buffers in the context of partially freed granules. On the other hand, a shared pool has no such equivalence and, therefore, has only truly pinned memory.

In an embodiment, once the requesting process completes use of the portion of memory, the memory is allocated back to one or more of the tunable memory pools. For example, the memory that was transferred from one or more tunable pools such as a buffer cache, to an untunable pool such as a large pool, is reallocated to at least one of the tunable pools after the requesting process has completed its use of the memory from the untunable pool. Hence, the memory resources are allocated to the pools that are more likely to need them, such as caches, which will aid the system performance. In a related embodiment, the memory that was transferred from one or more tunable pools to the untunable pool is held at the untunable pool for a period of time before its released and reallocated back to the other pools. The memory is held for the period of time in case a subsequent, and perhaps related, process also needs the large memory allocation from the untunable pool. For example, in the case of large parallel database queries, two or more similarly-executing processes may need similar memory resources so it would be disadvantageous to immediately release the memory from the untunable pool, only to have to perform the resize process all over again to allocate sufficient memory to the untunable pool for similar subsequent processes.

When a memory pool releases a granule for an immediate mode operation, a bitmap structure of the granule allocation state is used to indicate what parts of the granule are free. Subsequently, the requesting or calling pool passes this structure to a releasing pool callback to determine which additional bits of the granule are free. Each bit can take one of three states: (1) INUSE indicates that the releasing memory pool still owns the corresponding portion of memory; (2) FREE indicates that the releasing pool has released the memory; and (3) CONSUMED is set by the requesting pool after it has used the portion of memory for its own purposes.

Such a structure allows the caller to differentiate between areas of the granule that are newly freed versus those that were free the last time the granule was checked. Every time a memory pool needs memory for an untunable request, it first checks all of its partially allocated granules for new space by checking for the presence of new FREE chunks in addition to the already CONSUMED chunks.

Memory Exchange

A typical memory exchange, based on the memory exchange model of FIG. 1, is provided as an example as follows. The exchange described below can be performed as block 208 of FIG. 2.

A foreground-executing process fails to allocate needed memory in a memory pool, for example, memory pool 102a. In other words, the process is unable to use the amount of memory that it needs from pool 102a to complete its operation. Consequently, the executing process initiates a memory exchange operation by requesting memory pool 102a to generate N megabytes of memory.

Memory pool 102a first searches its own private list of partially freed granules obtained in the past to extract any newly freed memory. Supposing memory pool 102a was able to extract M megabytes from this process, the requesting process then informs the memory broker 104 that it needs (N-M) megabytes of memory.

Memory broker 104, via its exchange mechanism 110, generates a new resize request structure and selects the memory pool from which the memory should be transferred to the requesting pool, memory pool 102a. The resize request structure is described in detail above. Memory broker 104 relies on its optimization engine 108 to determine the optimal redistribution or reallocation of memory among the pools 102a–102d.

In response to the request structure, memory pool 102a again scans its list of granules to return free and partially free granules by linking such granules onto the request structure. Finally, memory broker 104, via its exchange mechanism 110, informs pool 102a to add the newly created free and partially free granules to its internal lists, and then invokes the requesting process to reattempt the memory allocation.

Hardware Overview

Figure 3:
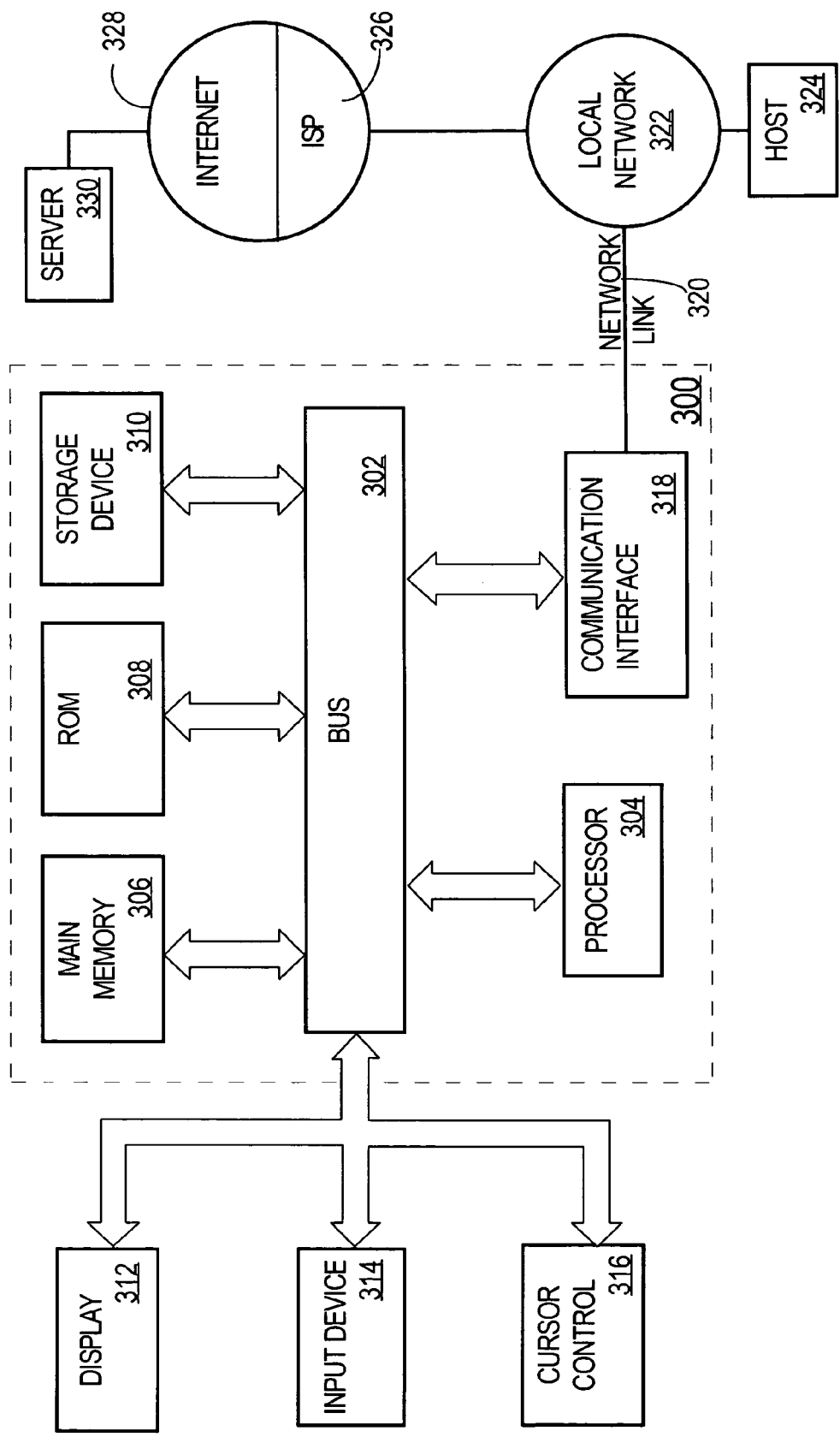
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, embodiments are at times described herein in the context of shared global memory that is shared among multiple processes within an instance of a database server. However, the memory need not be shared, and implementation of embodiments need not be in the database context because the general teachings are applicable to any system that allocates multiple memory pools, such as application servers, operating systems, resource planning systems, and the like. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for managing computer memory that is allocated among at least a first memory pool and a second memory pool, the method comprising the computer-implemented steps of:

generating first data that indicates a hit rate per pool size for different pool sizes of each memory pool of said first memory pool and said second memory pool;

wherein said first memory pool is used to satisfy a first class of memory request, wherein said second memory pool is used to satisfy a second class of memory request, and wherein the first class of memory request is a different class of memory request than said second class of memory request;

converting said first data to a second data, wherein the second data indicates performance penalties for said different pool sizes of said each memory pool;

wherein the performance penalties for the first memory pool account for a measured cost of a miss when satisfying the first class of memory request, and wherein the performance penalties for the second memory pool account for a measured cost of a miss when satisfying the second class of memory request;

determining, based at least in part on said second data that indicates the performance penalties for said different pool sizes of said each memory pool, a distribution of said computer memory comprising a combination of pool sizes that optimize performance of said computer memory, wherein the combination comprises:

a first pool size of the different pool sizes for the first memory pool that satisfies the first class of memory request, and a second pool size of the different pool sizes for the second memory pool that satisfies the second class of memory request;

automatically allocating portions of said computer memory to each of said memory pools based at least in part on said determining the distribution of said computer memory that optimizes the performance;

wherein said at least the first memory pool and the second memory pool includes a third memory pool that functions as a source of memory for executing processes;

in response to a request from a first process for use of memory from said third memory pool, allocating to said third memory pool a first portion of memory from one or more memory pools of said first memory pool and said second memory pool, wherein the allocating the first portion of memory comprises:

allocating a sub-portion of said first portion of memory, said sub-portion being used by a second process;

after allocating said first portion to said third memory pool, said second process continuing to use said sub-portion; and in response to completing use of said sub-portion by said second process, allowing said first process to use said sub-portion as part of said third memory pool;

wherein the method is performed by one or more computing devices.

2. The method of claim 1, wherein the step of determining includes determining that allocating a first amount of memory to said first memory pool would result in a first response time of a successful request and that allocating a second amount of memory to said first memory pool would result in a second response time of a successful request.

3. The method of claim 2, wherein said second response time is less than said first response time, wherein the step of automatically allocating portions of said computer memory comprises:

allocating to said first memory pool said second amount of memory based on said second response time of a successful request being less than said first response time of a successful request.

4. The method of claim 1, wherein one or more of said at least the first memory pool and the second memory pool includes a buffer cache that is used for caching copies of data items that are persistently stored in a repository separate from said buffer cache.

5. The method of claim 1, further comprising the computer-implemented step of:

after said first process has completed use of said first portion of said memory, allocating said first portion from said third memory pool to one or more memory pools of said first memory pool and said second memory pool.

6. The method of claim 5, further comprising the computer-implemented steps of:

after said first process has completed use of said first portion of said memory, maintaining allocation of said first portion to said third memory pool for a period of time before allocating said first portion to said one or more memory pools of said first memory pool and said second memory pool.

7. The method of claim 1, wherein said memory is shared among two or more processes executing as an instance of a database server.

8. The method of claim 1, wherein the step of generating first data comprises:

continuously monitoring attempts to retrieve data items from each of said first memory pool and said second memory pool.

9. The method of claim 1, comprising automatically performing, on a periodic basis, the steps of converting and determining.

10. The method of claim 1, wherein the step of determining comprises determining a first amount of said memory for allocation to said first memory pool, and wherein the first amount of said memory is different than a first current amount of said memory allocated to said first memory pool, the method further comprising the step of:

automatically changing said first current amount of said memory allocated to said first memory pool by a first portion of said first amount, resulting in a second current amount of said memory allocated to said first memory pool, wherein said first portion is less than said first amount; and after a period of time, automatically changing said second current amount of said memory allocated to said first memory pool by a second portion of said first amount.

11. The method of claim 10, wherein said first portion is substantially equal to said second portion.

12. The method of claim 1, wherein said memory is shared among two or more processes executing as an instance of an application, the method further comprising the computer-implemented steps of:

in response to shutting down said instance, recording in persistent memory how much of said memory is allocated to each of said first memory pool and said second memory pool.

13. The method of claim 12, further comprising the steps of:

in response to restarting said instance, reading, from said persistent memory, how much of said memory was allocated to each of said first memory pool and said second memory pool when said instance was shut down; and initially allocating said memory to said first memory pool and said second memory pool based on how much of said memory was allocated to each of said first memory pool and said second memory pool when said instance was shut down.

14. The method of claim 1, wherein the step of generating said first data includes predicting a hit rate per pool size based on previously-monitored hit rates per pool sizes.

15. A non-transitory computer-readable storage medium carrying one or more sequences of instructions which, when executed by one or more processors, causes the one or more processors to perform the steps of:

generating first data that indicates a hit rate per pool size for different pool sizes of each memory pool of said first memory pool and said second memory pool;

wherein said first memory pool is used to satisfy a first class of memory request, wherein said second memory pool is used to satisfy a second class of memory request, and wherein the first class of memory request is a different class of memory request than said second class of memory request;

converting said first data to a second data, wherein the second data indicates performance penalties for said different pool sizes of said each memory pool;

wherein the performance penalties for the first memory pool account for a measured cost of a miss when satisfying the first class of memory request, and wherein the performance penalties for the second memory pool account for a measured cost of a miss when satisfying the second class of memory request;

determining, based at least in part on said second data that indicates the performance penalties for said different pool sizes of said each memory pool, a distribution of said computer memory comprising a combination of pool sizes that optimize performance of said computer memory, wherein the combination comprises:
a first pool size of the different pool sizes for the first memory pool that satisfies the first class of memory request, and
a second pool size of the different pool sizes for the second memory pool that satisfies the second class of memory request;

automatically allocating portions of said computer memory to each of said memory pools based at least in part on said determining the distribution of said computer memory that optimizes the performance;

wherein said at least the first memory pool and the second memory pool includes a third memory pool that functions as a source of memory for executing processes;

in response to a request from a first process for use of memory from said third memory pool, allocating to said third memory pool a first portion of memory from one or more memory pools of said first memory pool and said second memory pool, wherein the allocating the first portion of memory comprises:
allocating a sub-portion of said first portion of memory, said sub-portion being used by a second process;
after allocating said first portion to said third memory pool, said second process continuing to use said sub-portion; and
in response to completing use of said sub-portion by said second process, allowing said first process to use said sub-portion as part of said third memory pool.

16. The computer-readable storage medium in claim 15, wherein the instructions for determining includes instructions for determining that allocating a first amount of memory to said first memory pool would result in a first response time of a successful request and that allocating a second amount of memory to said first memory pool would result in a second response time of a successful request.

17. The computer-readable storage medium in claim 16, wherein said second response time is less than said first response time, wherein the instructions for automatically allocating portions of said computer memory comprises instructions for:
allocating to said first memory pool said second amount of memory based on said second response time of a successful request being less than said first response time of a successful request.

18. The computer-readable storage medium in claim 15, wherein one or more of said at least the first memory pool and the second memory pool includes a buffer cache that is used for caching copies of data items that are persistently stored in a repository separate from said buffer cache.

19. The computer-readable storage medium in claim 15, wherein the instructions further comprise instructions for:
after said first process has completed use of said first portion of said memory, allocating said first portion from said third memory pool to one or more memory pools of said first memory pool and said second memory pool.

20. The computer-readable storage medium in claim 19, wherein the instructions further comprise instructions for:
after said first process has completed use of said first portion of said memory, maintaining allocation of said first portion to said first memory pool for a period of time before allocating said first portion to said one or more memory pools of said first memory pool and said second memory pool.

21. The computer-readable storage medium in claim 15, wherein said memory is shared among two or more processes executing as an instance of a database server.

22. The computer-readable storage medium in claim 15, wherein the instructions for generating first data comprises instructions for:
continuously monitoring attempts to retrieve data items from each of said first memory pool and said second memory pool.

23. The computer-readable storage medium in claim 15, wherein the instructions further comprises instructions for automatically performing, on a periodic basis, the steps of converting and determining.

24. The computer-readable storage medium in claim 15, wherein the instructions for determining comprises instructions for determining a first amount of said memory for allocation to said first memory pool, and wherein the first amount of said memory is different than a first current amount of said memory allocated to said first memory pool, the instructions further comprising instructions for:
automatically changing said first current amount of said memory allocated to said first memory pool by a first portion of said first amount, resulting in a second current amount of said memory allocated to said first memory pool, wherein said first portion is less than said first amount; and
after a period of time, automatically changing said second current amount of said memory allocated to said first memory pool by a second portion of said first amount.

25. The computer-readable storage medium in claim 24, wherein said first portion is substantially equal to said second portion.

26. The computer-readable storage medium in claim 15, wherein said memory is shared among two or more processes executing as an instance of an application, the instructions further comprising instructions for:
in response to shutting down said instance, recording in persistent memory how much of said memory is allocated to each of said first memory pool and said second memory pool.

27. The computer-readable storage medium in claim 26, wherein the instructions further comprises instructions for:
in response to restarting said instance, reading, from said persistent memory, how much of said memory was allocated to each of said first memory pool and said second memory pool when said instance was shut down; and
initially allocating said memory to said first memory pool and said second memory pool based on how much of said memory was allocated to each of said first memory pool and said second memory pool when said instance was shut down.

28. The computer-readable storage medium in claim 15, wherein the instructions for generating said first data includes instructions for predicting a hit rate per pool size based on previously-monitored hit rates per pool sizes.

29. The method of claim 1, wherein said at least the first memory pool and the second memory pool comprises: a first memory pool used to store SQL cursors, a second memory pool used to store objects represented in the Java programming language, and a third memory pool used to store data items retrieved from persistent storage in a buffer.

30. The computer-readable storage medium of claim 15, wherein said at least the first memory pool and the second memory pool comprises: a first memory pool used to store SQL cursors, a second memory pool used to store objects represented in the Java programming language, and a third memory pool used to store data items retrieved from persistent storage in a buffer.

* * * * *

UNITED STATES PATENT AND TRADEMARK OFFICE
CERTIFICATE OF CORRECTION

PATENT NO. : 7,783,852 B2  
APPLICATION NO. : 10/746471  
DATED : August 24, 2010  
INVENTOR(S) : Lahiri et al.

Page 1 of 1

It is certified that error appears in the above-identified patent and that said Letters Patent is hereby corrected as shown below:

In column 5, line 4, delete "10" and insert -- IO --, therefor.

In column 6, line 28, delete "Managment" and insert -- Management --, therefor.

Signed and Sealed this
Tenth Day of May, 2011

David J. Kappos
*Director of the United States Patent and Trademark Office*